United States Patent
Li et al.

(10) Patent No.: US 7,487,294 B2
(45) Date of Patent: Feb. 3, 2009

(54) RAID SYSTEMS AND SETUP METHODS THEREOF

(75) Inventors: Yong Li, Taipei (TW); Qing-Chao Luo, Taipei (TW)

(73) Assignee: Via Technologies, Inc., Taipei (TW)

( * ) Notice: Subject to any disclaimer, the term of this patent is extended or adjusted under 35 U.S.C. 154(b) by 74 days.

(21) Appl. No.: 11/420,084

(22) Filed: May 24, 2006

(65) Prior Publication Data

US 2007/0180190 A1    Aug. 2, 2007

(30) Foreign Application Priority Data

Dec. 8, 2005    (TW) .............................. 94143351 A (51) Int. Cl.
*G06F 12/00* (2006.01)
(52) U.S. Cl. ........................ 711/114; 711/162; 711/154; 711/171
(58) Field of Classification Search ................ 711/114, 711/162, 154, 171
See application file for complete search history.

(56) References Cited

U.S. PATENT DOCUMENTS

| 6,079,029 A | * | 6/2000 | Iwatani et al. ................. 714/6 |
| 6,397,293 B2 | | 5/2002 | Shrader et al. |
| 6,718,436 B2 | | 4/2004 | Kim et al. |

FOREIGN PATENT DOCUMENTS

| CN | 1553345 | 12/2004 |
| TW | 1244586 | 12/2005 |

OTHER PUBLICATIONS

TW Office Action mailed Apr. 11, 2008

* cited by examiner

*Primary Examiner*—Hyung S Sough
*Assistant Examiner*—Mardochee Chery
(74) *Attorney, Agent, or Firm*—Thomas, Kayden, Horstemeyer & Risley (57) ABSTRACT

A RAID (Redundant Arrays of Independent Disks) system is provided. At least a first group of disks is selected to create a RAID 5 architecture. A second group of disks within the first group is selected to create a RAID 1 architecture. The RAID 5 and RAID 1 architectures are concatenated. The number of disks in the first group is greater than 2, and that in the second group equals 2.

16 Claims, 11 Drawing Sheets

RAID SYSTEMS AND SETUP METHODS THEREOF

CROSS-REFERENCE TO RELATED APPLICATION

This application is related to copending application entitled "RAID systems and setup methods thereof ", U.S. application Ser. No : 11/420,096 filed on May 24, 2006.

BACKGROUND OF THE INVENTION

1. Field of the Invention

The disclosure relates generally to RAID (Redundant Arrays of Independent Disks) systems and setup methods thereof, and, more particularly to systems and setup methods thereof that integrate RAID 5 and RAID 1 architecture.

2. Description of the Related Art

Employment of disk arrays can improve access speed to disks and prevent data lost due to disk failure. Disk arrays integrate several disks into an array, used as a single disk. Data in a disk array is stripped and stored in different disks. During data access, related disks in the disk array can work simultaneously, reducing the data access time.

The technique for disk array is referred to as RAID, and configured in levels RAID 0 to RAID 5. In some RAID levels, in addition to data strips stored in different disks, parity information corresponding to data can be further calculated and stored in a specific disk of the disk array. If a disk storing one of the data strips fails, the data strip in the failed disk can be recovered according to the other data strips and the parity information.

Figure 1:
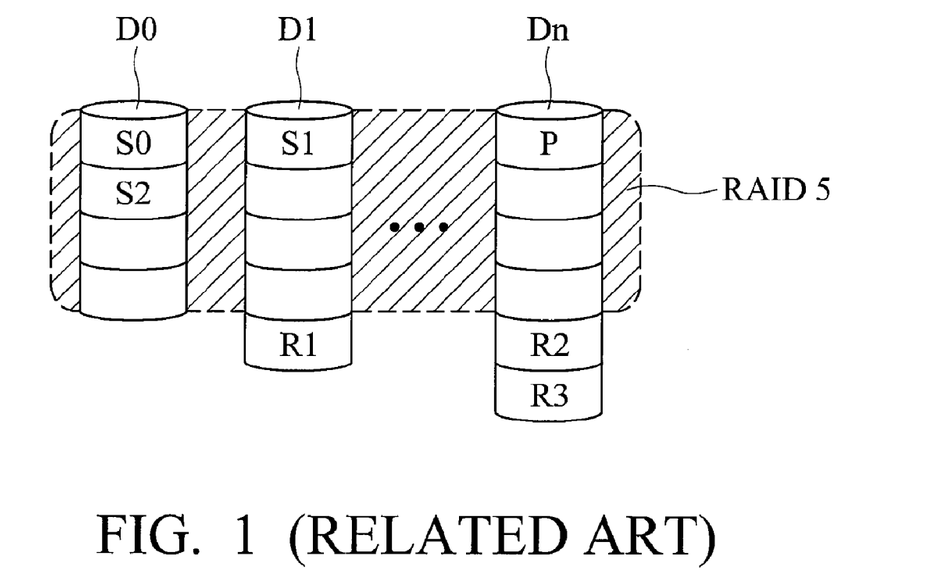
FIG. 1 is a schematic diagram illustrating a conventional fault tolerant RAID 5 architecture.

FIG. 1 is a schematic diagram illustrating a conventional fault tolerance RAID 5 architecture. As shown in FIG. 1, disks D0~Dn are selected as a group to create a RAID 5 architecture, in which data strips S0~S2 are stored in different disks. It is understood that a strip size parameter must be configured during the creation of RAID 5 architecture, with data stripped and stored in different disks accordingly. Additionally, parity information P is stored in a specific disk.

Generally, an enterprise extends a storage system according to its own requirement. With advances in manufacturing technology and process, disk capacity has grown. Several disks having different sizes may be utilized in an enterprise. In conventional disk array technology, however, only a single RAID level can be applied, such that the capacity of each disk cannot be fully utilized. In FIG. 1, since disks D0~Dn are selected to create a RAID 5 architecture, and disk D0 has minimum disk capacity, the disk capacity of disk D0 size in respective disks is selected to create the RAID 5 architecture. As shown in FIG. 1, since the disk size of respective disks are different, the remnant disk capacity R1 in disk D1 and remnant disk capacity R2 and R3 in disk Dn cannot be fully utilized.

BRIEF SUMMARY OF THE INVENTION

RAID systems and setup methods thereof are provided.

An embodiment of a RAID system comprises a plurality of disks. At least a first group of disks is selected to create a RAID 5 architecture. A second group of disks within the first group is selected to create a RAID 1 architecture. The RAID 5 and RAID 1 architectures are concatenated. The number of disks in the first group is greater than 2, and that in the second group equals 2.

In an embodiment of a RAID setup method, at least a first group of disks is selected, and a RAID 5 architecture is created accordingly. A second group of disks within the first group is selected, and a RAID 1 architecture is created accordingly. The RAID 5 and RAID 1 architectures are concatenated. The number of disks in the first group is greater than 2, and that in the second group equals 2.

RAID setup methods may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

RAID systems and setup methods thereof are provided.

Figure 2:
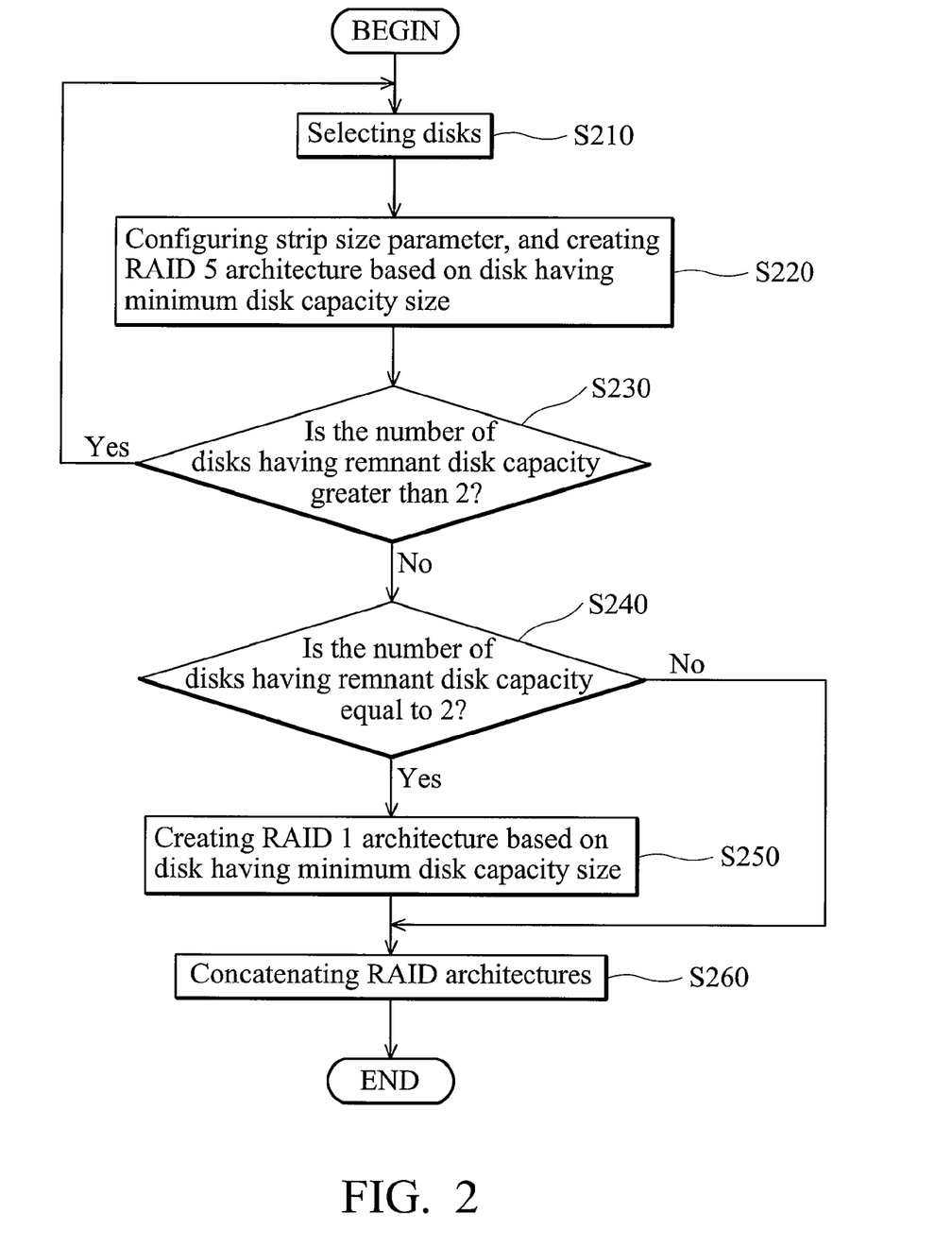
FIG. 2 is a flowchart showing a first embodiment of a RAID setup method.

FIG. 2 is a flowchart showing a first embodiment of a RAID setup method. It is noted that a plurality of disks, each having corresponding disk capacity size are provided for disk array creation in this embodiment.

In step S210, a number of disks are selected from the disks. The selected disks are prepared to create a RAID 5 architecture. It is noted that the number of the selected disks must be greater than 2. In some embodiments, the selected disks may be all the disks during first selection. In step S220, a strip size parameter is configured, and a RAID 5 architecture is created based on the disk having minimum disk capacity size among the selected disks. Since data is stripped and stored in different disks, a strip size parameter must be configured during the creation of RAID 5 architecture, and data is stripped and stored in different disks accordingly. It is understood that the storage of data in the RAID 5 architecture is not limited to any practice, and since the RAID 5 architecture is known as industry standard, the creation thereof is omitted here.

In step S230, it is determined whether the number of disks having remnant disk capacity is greater than 2. It is understood that each selected disk must provide a disk capacity with the minimum disk capacity size to create the RAID 5 architecture. Since respective disks may have different disk capacity size, some disks may have remnant disk capacity. If so, the procedure goes to step S210, the disks having remnant disk capacity are selected, and in step S220, a strip size parameter is configured, and a RAID 5 architecture is created based on the disk having minimum disk capacity size among the selected disks. If not, in step S240, it is determined whether the number of disks having remnant disk capacity equals 2. If not, the procedure goes to step S260. If so, in step S250, a RAID 1 architecture is created based on the disk having minimum disk capacity size among the selected disks. Similarly, since the RAID 1 architecture is known as industry standard, the creation thereof is omitted here. In step S260, the RAID 5 and RAID 1 architectures are concatenated. It is understood that, in this embodiment, the RAID 5 and RAID 1 architectures are concatenated using JBOD (Just a Bunch Of Disks) technique. JBOD is well-known and omitted herefrom.

Figure 3:
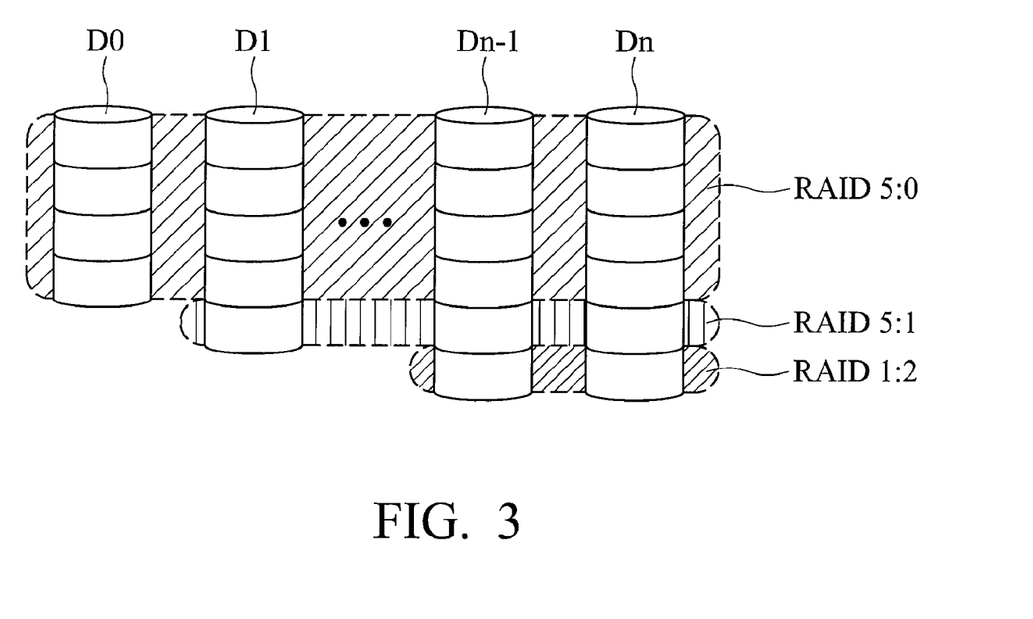
FIG. 3 is a schematic diagram illustrating a first embodiment of a RAID system.

FIG. 3 is a schematic diagram illustrating a first embodiment of a RAID system. As shown in FIG. 3, disks D0~Dn are first selected to create a RAID 5 architecture, named RAID 5:0. Since disks D1~Dn having remnant disk capacity exist, and the number of disks having remnant disk capacity is greater than 2, disks D1~Dn are selected to create a RAID 5 architecture, named RAID 5:1. Since disks Dn-1 and Dn having remnant disk capacity exist, and the number of disks having remnant disk capacity equals 2, disks Dn-1 and Dn are selected to create a RAID 1 architecture, named RAID 1:2. The RAID 5:0, RAID 5:1 and RAID 1:2 are concatenated as a disk array using JBOD technique. It is understood that once the disk array is created, a RAID controller (not show) can perform related access control operations according to the RAID architecture that data belonged in or required to write to. The control operations comprise generation and storage of parity information corresponding to data, data generation using data strips, and recovery of data strip using the parity information. The data access controls in respective RAID architectures are well-known and omitted herefrom.

Figure 4:
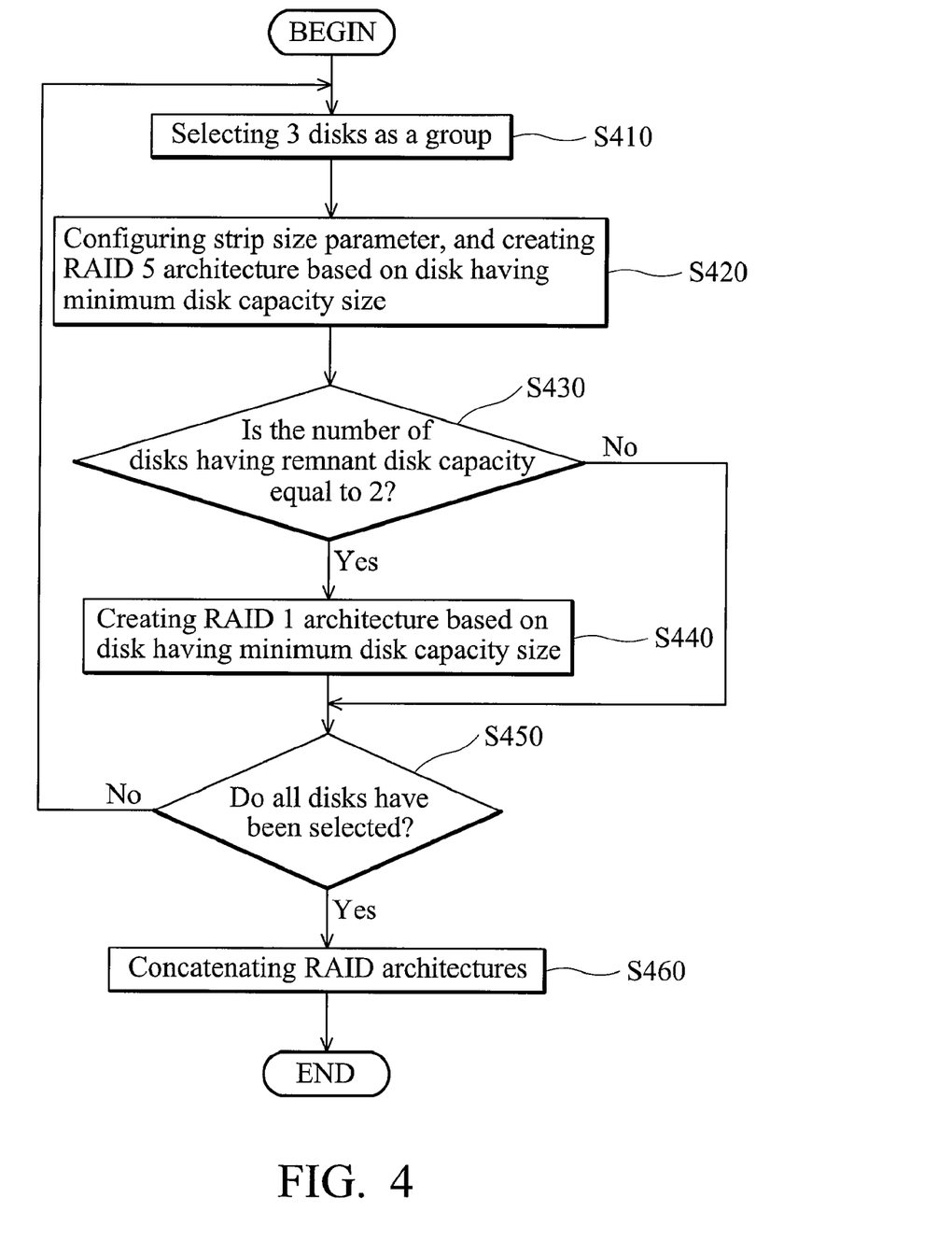
FIG. 4 is a flowchart showing a second embodiment of a RAID setup method.

FIG. 4 is a flowchart showing a second embodiment of a RAID setup method. In this embodiment, the number of disks is 3n, in which n=1,2, . . . .

In step S410, 3 disks are selected as a group. In step S420, a strip size parameter is configured, and a RAID 5 architecture is created based on the disk having minimum disk capacity size among the group. In step S430, it is determined whether the number of disks having remnant disk capacity equals 2. If not, the procedure goes to step S450. If so, the procedure goes to step S440, a RAID 1 architecture is created based on the disk having minimum disk capacity size among the two disks. In step S450, it is determined whether all disks have been selected. If not, the procedure goes to step S410. If so, in step S460, the RAID architectures are concatenated.

Figure 5:
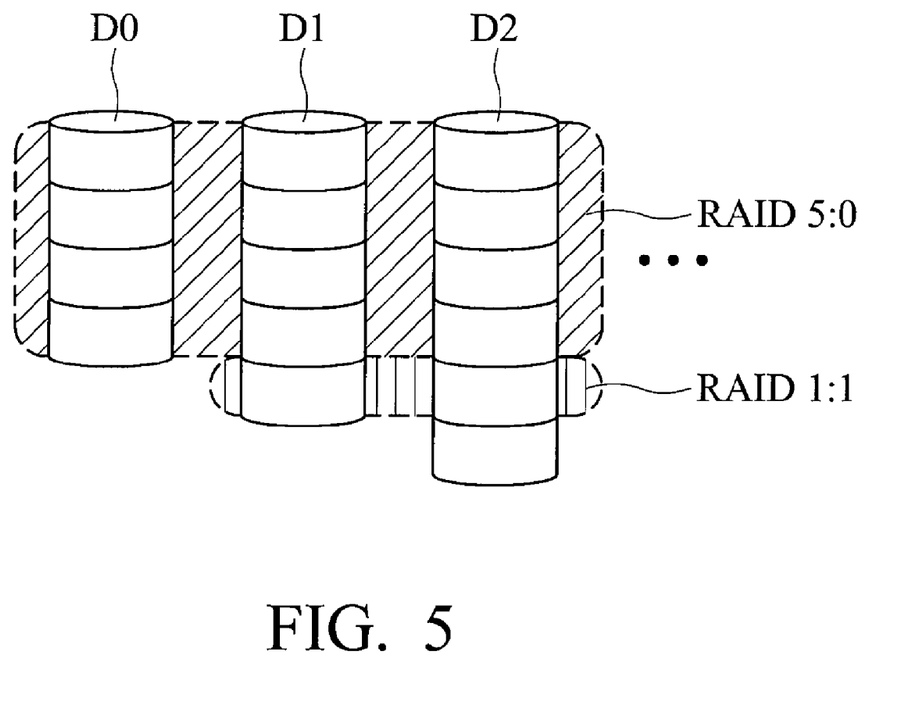
FIG. 5 is a schematic diagram illustrating a second embodiment of a RAID system.

FIG. 5 is a schematic diagram illustrating a second embodiment of a RAID system. As shown in FIG. 5, disks D0, D1 and D2 are selected as a group to create a RAID 5 architecture, named RAID 5:0. Since disks D1 and D2 have remnant disk capacity, disks D1 and D2 are selected to create a RAID 1 architecture, named RAID 1:1. Similarly, other disks undergo the same creation procedure until all disks have been selected. Finally, the RAID 5:0 and RAID 1:1 are concatenated as a disk array.

Figure 6:
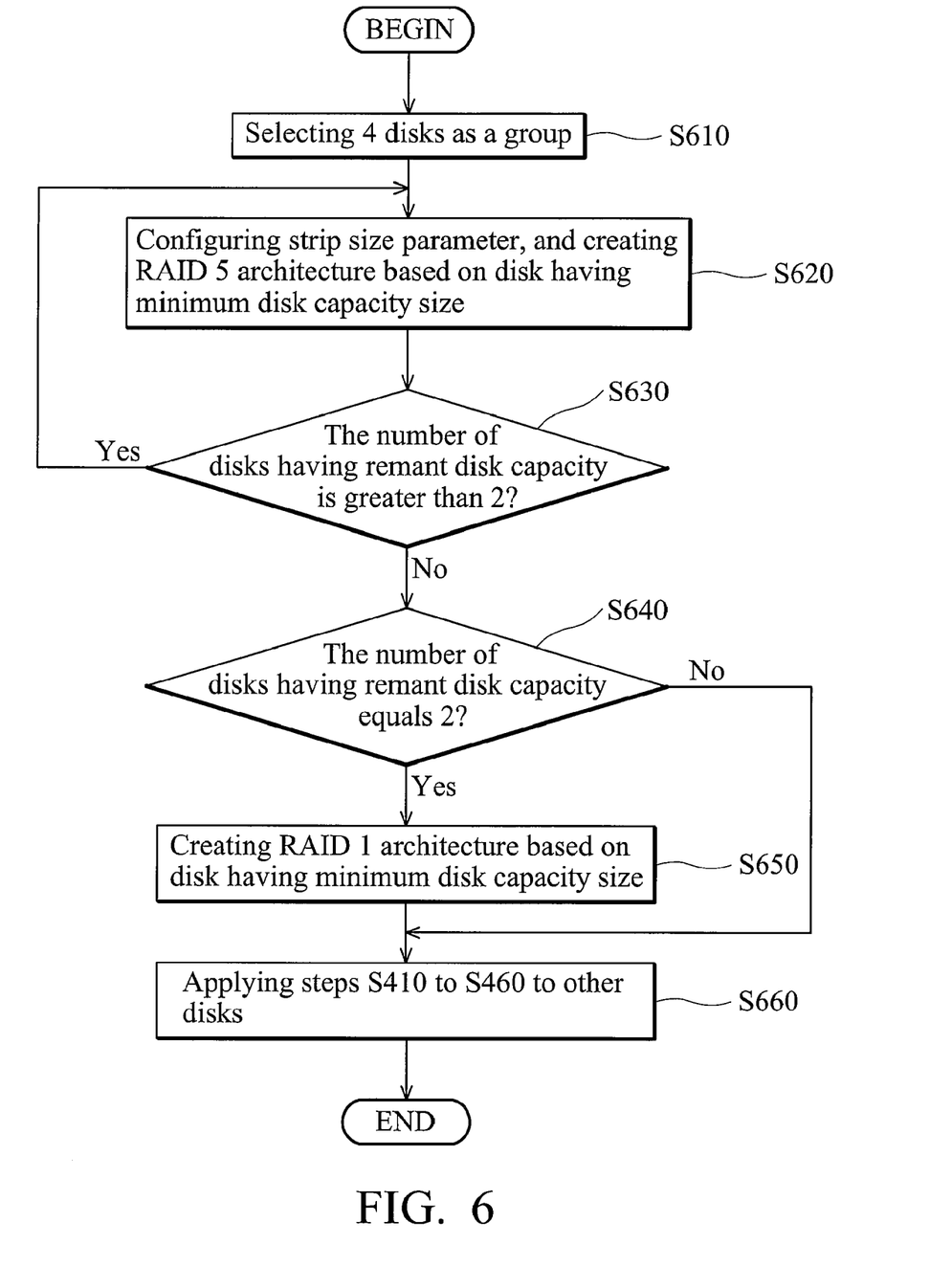
FIG. 6 is a flowchart showing a third embodiment of a RAID setup method.

FIG. 6 is a flowchart showing a third embodiment of a RAID setup method. In this embodiment, the number of disks is 3n+1, in which n=1,2, . . . .

In step S610, 4 disks are selected as a group. In step S620, a strip size parameter is configured, and a RAID 5 architecture is created based on the disk having minimum disk capacity size among the group. In step S630, it is determined whether the number of disks having remnant disk capacity is greater than 2. If so, the procedure goes to step S620. If the number of disks having remnant disk capacity does not equal 2, the procedure goes to step S660. If the number of disks having remnant disk capacity equals 2, the procedure goes to step S650, a RAID 1 architecture is created based on the disk having minimum disk capacity size among the two disks. In step S650, other disks are applied the operations of S410 to S460 in the second embodiment.

Figure 7:
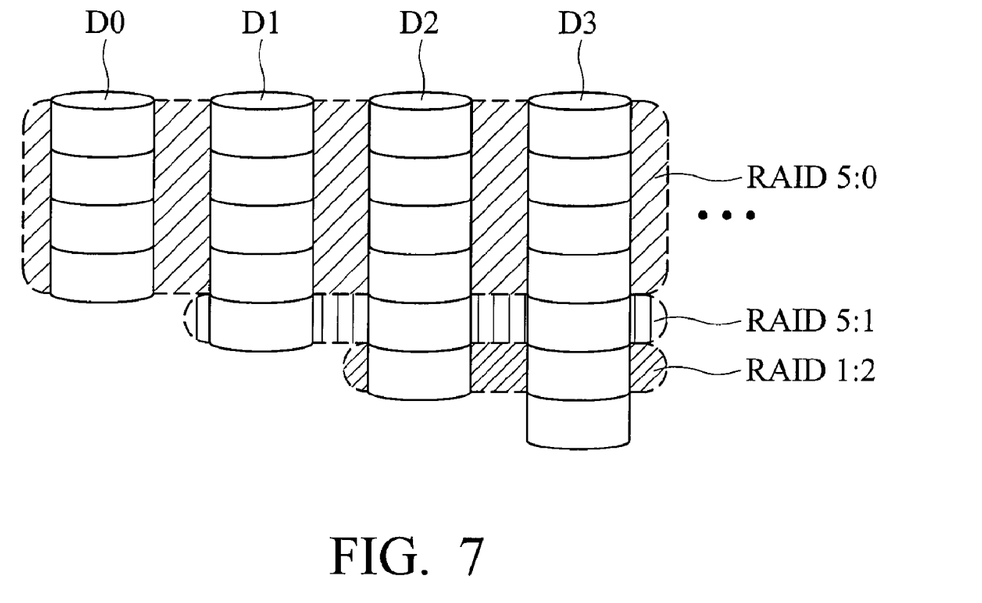
FIG. 7 is a schematic diagram illustrating a third embodiment of a RAID system.

FIG. 7 is a schematic diagram illustrating a third embodiment of a RAID system. As shown in FIG. 7, disks D0, D1, D2 and D3 are selected as a group to create a RAID 5 architecture, named RAID 5:0. Since disks D1, D2 and D3 have remnant disk capacity, disks D1, D2 and D3 are selected to create a RAID 5 architecture, named RAID 5:1. Since disks D2 and D3 have remnant disk capacity, disks D2 and D3 are selected to create a RAID 1 architecture, named RAID 1:2. Other disks undergo the creation procedure in the second embodiment (as shown in FIG. 5) until all disks have been selected. Finally, the RAID architectures are concatenated as a disk array.

Figure 8:
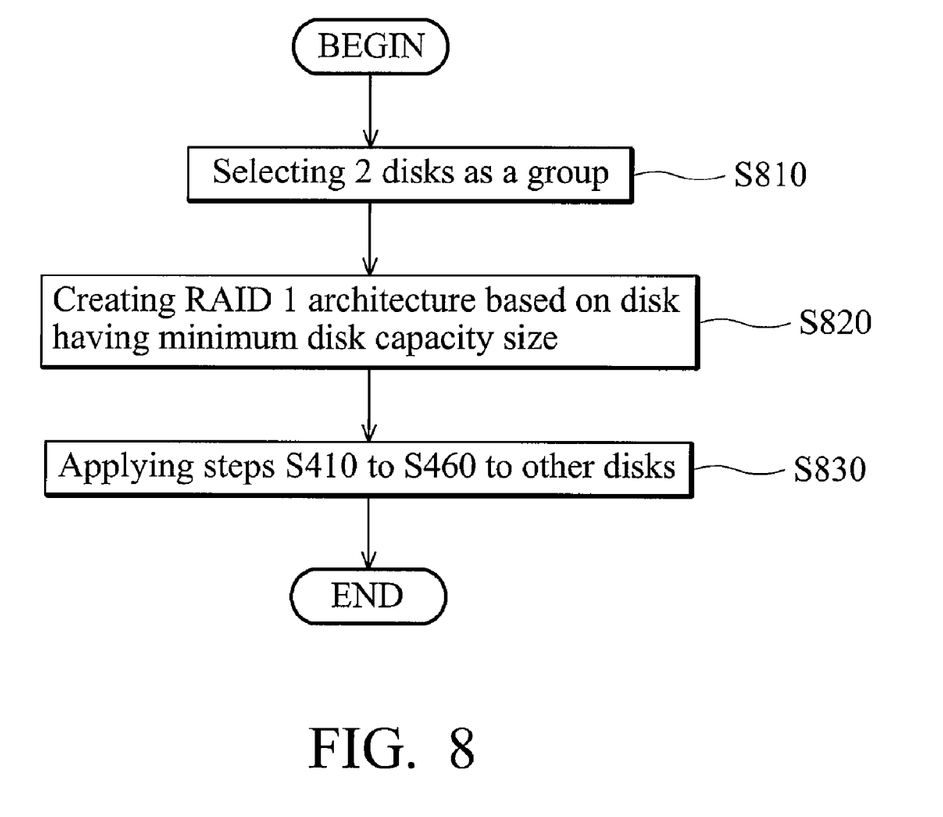
FIG. 8 is a flowchart showing a fourth embodiment of a RAID setup method.

FIG. 8 is a flowchart showing a fourth embodiment of a RAID setup method. In this embodiment, the number of disks is 3n+2, in which n=1, 2, . . . .

In step S810, 2 disks are selected as a group. In step S820, a RAID 1 architecture is created based on the disk having minimum disk capacity size among the group. Since the number of disks is 3n+2, and the number of unselected disks after the RAID 1 architecture creation in steps S810 and S820 is 3n, the unselected disks can be applied the creation operation in the second embodiment. Therefore, in step S830, other disks are applied the operations of steps S410 to S460 in the second embodiment.

Figure 9:
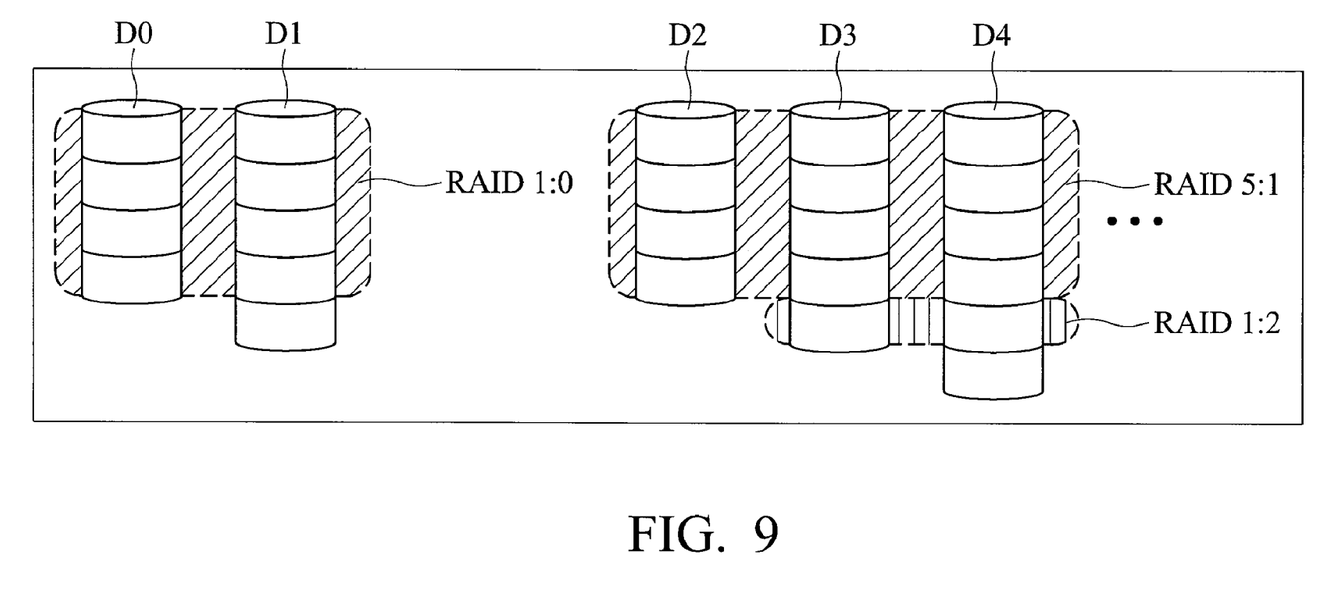
FIG. 9 is a schematic diagram illustrating a fourth embodiment of a RAID system.

FIG. 9 is a schematic diagram illustrating a fourth embodiment of a RAID system. As shown in FIG. 9, disks D0 and D1 are selected as a group to create a RAID 1 architecture, named RAID 1:0. Other disks undergo the creation procedure in the second embodiment (as shown in FIG. 5). For example, disks D2, D3 and D4 are selected to create a RAID 5 architecture, named RAID 5:1. Since disks D3 and D4 have remnant disk capacity, disks D3 and D4 are selected to create a RAID 1 architecture, named RAID 1:2. Similarly, other disks undergo the same creation procedure for the disks D2, D3 and D4 until all disks have been selected. Finally, the RAID architectures are concatenated as a disk array.

Figure 10:
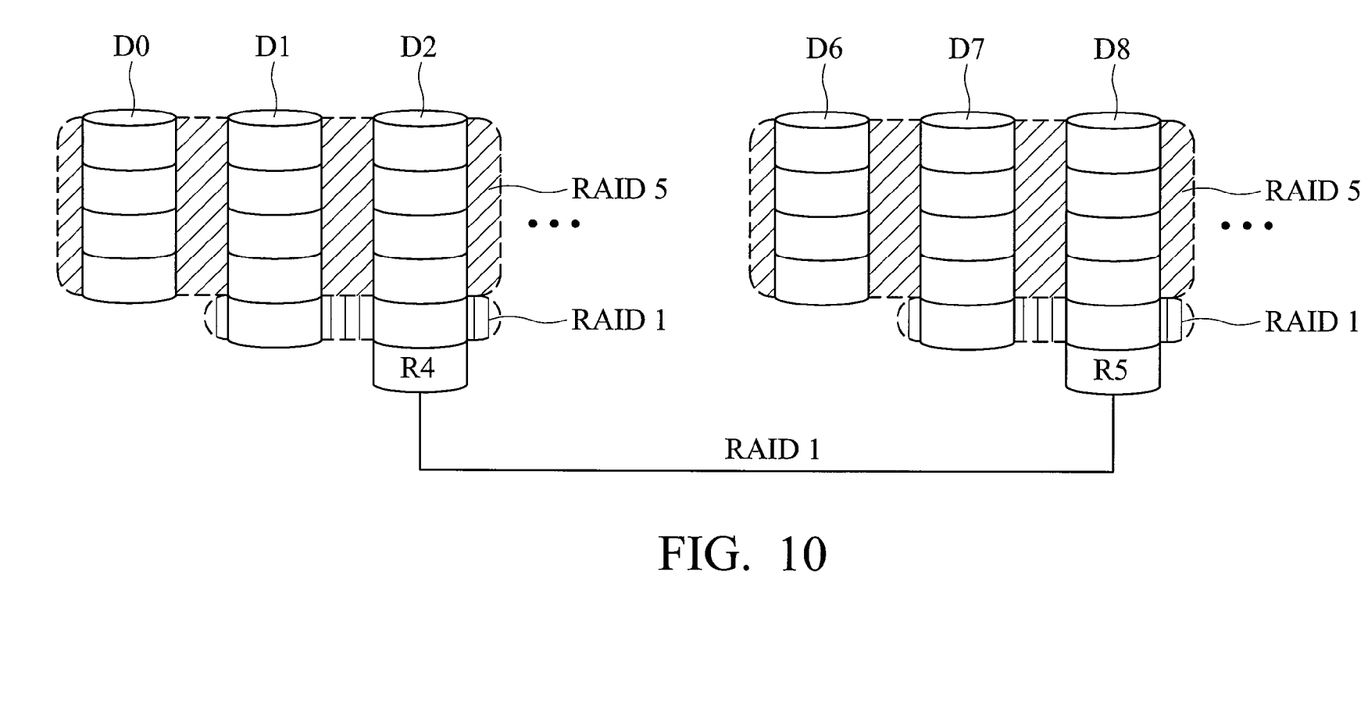
FIG. 10 is a schematic diagram illustrating a fifth embodiment of a RAID system.
Figure 11:
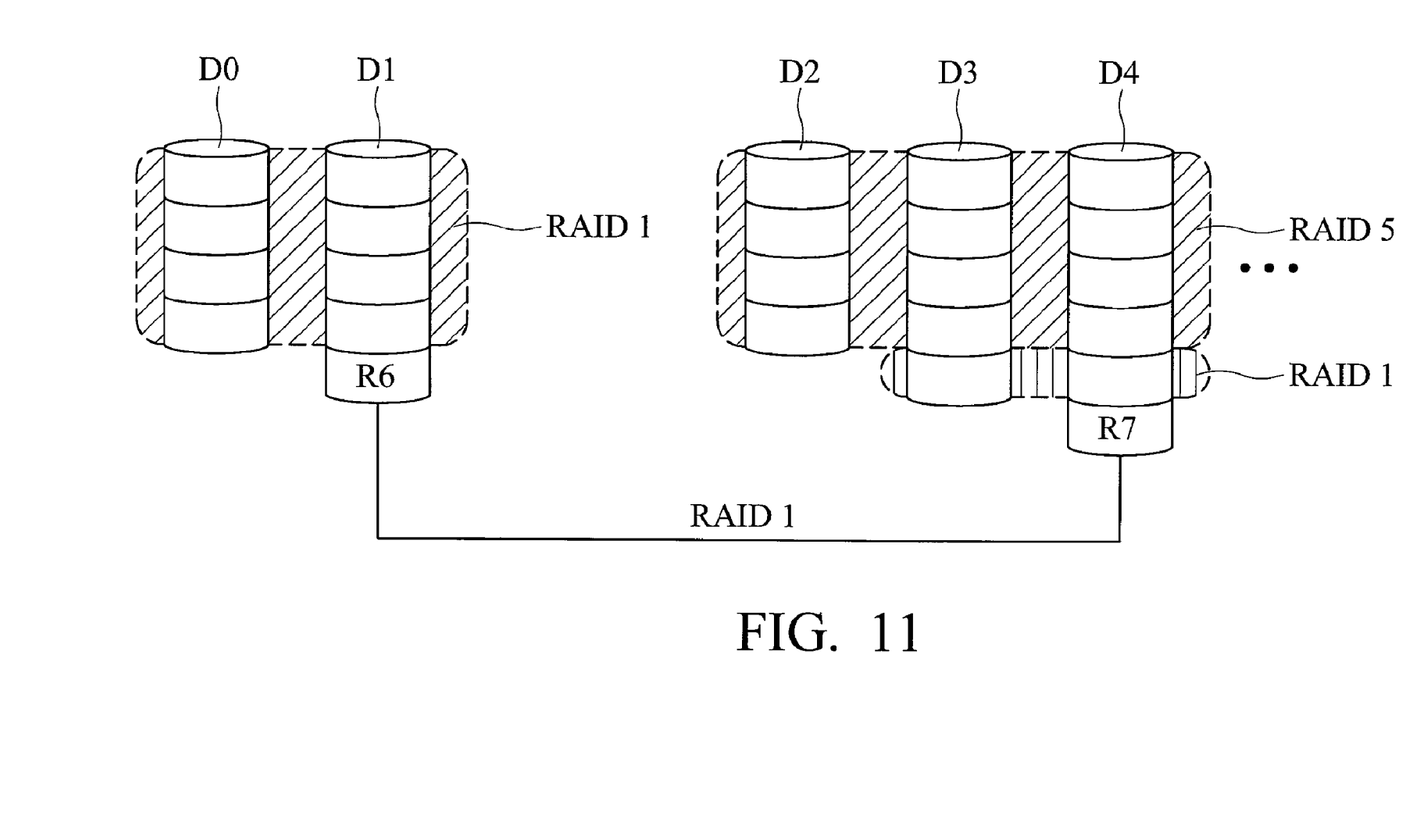
FIG. 11 is a schematic diagram illustrating a sixth embodiment of a RAID system.

It is understood that, in different embodiments, some disks may have remnant disk capacity in respective groups after RAID creation. The disks having remnant disk capacity in different groups can be used to create a RAID 1 architecture, and concatenated with other RAID architectures. FIG. 10 is a schematic diagram illustrating a fifth embodiment of a RAID system. As shown in FIG. 10, in the second embodiment, disks D2 and D8 in different groups have remnant disk capacity R4 and R5, respectively. The remnant disk capacity R4 of the disk D2 and the remnant disk capacity R5 of the disk D8 can be used to create a RAID 1 architecture, and concatenated with other RAID architectures, such that the disk capacity can be fully utilized. FIG. 11 is a schematic diagram illustrating a sixth embodiment of a RAID system. As shown in FIG. 11, in the fourth embodiment, disks D1 and D4 in different groups have remnant disk capacity R6 and R7, respectively. The remnant disk capacity R6 of the disk D1 and the remnant disk capacity R7 of the disk D4 can be used to create a RAID 1 architecture, and concatenated with other RAID architectures, such that the disk capacity can be fully utilized.

RAID systems and setup methods thereof, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A RAID system, comprising:
   a plurality of disks;
   wherein at least a first group of the disks is selected to create a RAID 5 architecture, a second group of the disks within the first group is selected to create a RAID 1 architecture, the RAID 5 and RAID 1 architectures are concatenated, and the number of the disks in the first group is greater than 2, and that in the second group equals 2;
   wherein the RAID 5 architecture corresponding to the first group is created based on the disks having minimum disk capacity size among the first group, and the disks in the second group are the disks having remnant disk capacity after the disks in the first group are used to create the RAID 5 architecture, and the RAID 1 architecture corresponding to the second group is created with the remnant disk capacity based on the disks having minimum remnant disk capacity size among the second group.

2. The system of claim 1 wherein a third group of the disks is selected to create a RAID 1 architecture before the RAID 5 architecture corresponding to the first group is created, and the RAID 5 architecture, the RAID 1 architectures corresponding to the second group and RAID 1 architecture corresponding to the third group are concatenated, in which the number of the disks in the third group is 2, and the disks in the third group and the disks in the first group are not overlapped.

3. The system of claim 2 wherein one of the disks having remnant disk capacity in the third group and one of the disks having remnant disk capacity in the second group are selected to create a RAID 1 architecture, and the RAID 5 architecture, and RAID 1 architectures corresponding to the second group and the RAID 1 architecture corresponding to the disks having remnant disk capacity in the third and second groups are concatenated.

4. The system of claim 1 wherein the number of the disks in the first group is equal to 3.

5. The system of claim 1 wherein the RAID 5 architecture corresponding to the first group comprises a strip size parameter, and data is stripped and stored in the disks of the first group accordingly.

6. The system of claim 5 wherein parity information is stored in one of the disks in the RAID 5 architecture corresponding to the first group.

7. The system of claim 1 wherein data is mirrored to each disk in the RAID 1 architecture corresponding to the second group.

8. The system of claim 1 wherein the RAID 5 and RAID 1 architectures are concatenated using JBOD (Just a Bunch Of Disks) technique.

9. A RAID setup method for use in a plurality of disks, comprising:
   selecting at least a first group of the disks to create a RAID 5 architecture;
   selecting a second group of the disks within the first group to create a RAID 1 architecture; and
   concatenating the RAID 5 and RAID 1 architectures,
   wherein the number of the disks in the first group is greater than 2, and that in the second group equals 2;
   wherein the RAID 5 architecture corresponding to the first group is created based on the disks having minimum disk capacity size among the first group, and the disks in the second group are the disks having remnant disk capacity after in the disks in the first group are used to create the RAID 5 architetcure, and the RAID architecture corresponding to the second group is created with the remnant disk capacity based on the disks having minimum remnant disk capacity size among the second group.

10. The method of claim 9 further comprising:
    selecting a third group of the disks to create a RAID 1 architecture before the RAID 5 architecture corresponding to the first group is created; and
    concatenating the RAID 5 architecture, the RAID 1 architectures corresponding to the second group and the RAID 1 architecture corresponding to the third group;
    wherein the number of the disks in the third group is 2, and the disks in the third group and the disks in the first group are not overlapped.

11. The method of claim 10 further comprising:
    selecting one of the disks having remnant disk capacity in the third group and one of the disks having remnant disk capacity in the second group to create a RAID 1 architecture; and
    concatenating the RAID 5 architecture, the RAID 1 architectures corresponding to the second group and the RAID 1 architecture corresponding to the disks having remnant disk capacity in the third and second groups.

12. The method of claim 9 wherein the number of the disks in the first group is equal to 3.

13. The method of claim 9 further comprising configuring a strip size parameter for the RAID 5 architecture corresponding to the first group, in which data is stripped and stored in the disks of the first group accordingly.

14. The method of claim 13 further comprising storing parity information in one of the disks in the RAID 5 architecture corresponding to the first group.

15. The method of claim 9 further comprising mirroring data to each disk in the RAID 1 architecture corresponding to the second group.

16. The method of claim 9 further comprising concatenating the RAID 5 and RAID 1 architectures using JBOD (Just a Bunch Of Disks) technique.

* * * * *